3,426,125
Patented Feb. 4, 1969

3,426,125

METHOD OF TREATING DIABETES MELLITUS

Yukio Shigeta, 3, 6-chome, Minatogawa-cho, Hyogo-ku, Kobe, Kozo Okamoto, 14 Takahara-cho, Tanakahigashi, Sakyo-ku, Kyoto, and Jiro Terumichi, 1156-2, Okamoto, Motoyama-cho, Kobe, Japan No Drawing. Continuation of application Ser. No. 446,411, Apr. 7, 1965. This application Jan. 25, 1968, Ser. No. 700,652
U.S. Cl. 424—94 5 Claims
Int. Cl. A61k *19/02*

This application is a continuation of Ser. No. 446,411 filed Apr. 7, 1965, now abandoned.

The present invention is concerned with a method of treating diabetes mellitus, which comprises administering coenzyme $Q_7$ of the formula

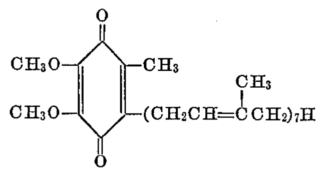

to a sufferer from the disease.

Heretofore, insulin injection or oral administration of such hypoglycemic drugs as sulfonylureas and biguanides has been employed for the treatment of diabetes mellitus. However, it is indeed true that blood sugar may be reduced by the hitherto known treatment, but it is difficult to control the other metabolic disorders and/or various complications. In addition, insulin can be used only by injection, so that it is associated with great inconvenience from the viewpoints of sterility and storage, and moreover a hazard of overdosage, which may lead to excess hypoglycemia and death, may sometimes accompany insulin therapy.

Furthermore, prolonged insulin therapy may result in the production of insulin antibody and, as a result, decrease in potency and insulin allergy may often occur. The sulfonylureas can be applied only over a relatively limited range and, by the application of said sulfonylureas, satisfactory control cannot be achieved in certain types such as juvenile (growth-onset), lean-type, insulin-dependent, brittle-type and keto-acidosis prone diabetes, and also the said drugs are ineffective in the presence of acute metabolic imbalance such as occurs in infections, trauma and surgical operations (major surgery). Moreover, the drugs can not be used in diabetes mellitus complicated by nephropathy and liver damage. In addition, it is often the case that by the application of the drugs secondary failure is encountered clinically and side effects such as gastric irritation or allergic rashes and leucopenia are experienced.

Furthermore, the biguanides, besides their hypoglycemic action, have an undesirable action of suppression of peripheral glucose oxidation. This suppression brings about accumulation of pyruvic acid and lactic acid in the blood and, as a result, as the lactic acid acts as a so-called uncoupler, lactic acidosis is encountered clinically. To make the matter worse, the application of the biguanides is often accompanied by a further additional disadvantage of gastro-intestinal disturbances.

Such being the case, a drug, which can be safely applied without undesirable side effects to the human body, and also which can be administered by oral administration, not by injection which is a troublesome application means in daily life, and is able to lower blood sugar gradually, to decrease urinary sugar, to control lipid metabolic or other metabolic disorders, has been a desideratum in the art.

Coenzyme $Q_7$ is one of the coenzymes which are present in animal and plant organs, and in microorganisms such as yeast, especially in the mitochondria of the cells. Testing this coenzyme $Q_7$ on a sufferer from diabetes mellitus and its complications, has uncovered the interesting new findings that the coenzyme $Q_7$ has the actions of lowering blood sugar, decreasing urinary sugar and improving other metabolic disorders, and that the coenzyme $Q_7$, moreover, is useful in the treatment of diabetes mellitus. The present invention is based on said new findings by the present inventors.

The multiple homologues of coenzyme Q comprise such compounds as $Q_1$, $Q_2$, $Q_3$, . . . $Q_{10}$, etc., according to the number of units in the isoprene chain. When the inventors investigated the content of the coenzyme Q in the liver following administration of coenzyme $Q_1$, $Q_2$, $Q_3$, $Q_4$, $Q_5$, $Q_6$, $Q_7$, $Q_8$, $Q_9$ and $Q_{10}$ to rats, it was noted that coenzyme $Q_7$, $Q_8$, $Q_9$ and $Q_{10}$ significantly increased the intramitochondrial coenzyme Q level of the liver cells, while coenzyme $Q_1$–$Q_6$ had hardly any increasing effect. This result clearly shows that coenzyme $Q_7$, $Q_8$, $Q_9$ and $Q_{10}$ are incorporated or gathered into cells, and therefore it may be said that administration of coenzyme $Q_7$, $Q_8$, $Q_9$ and $Q_{10}$ is significant for the elevation of the intramitochondrial coenzyme Q level.

As stated above, coenzyme Q is widely distributed in animal and plant tissues, and is also found in yeast. However, the number of isoprene chains in the coenzyme Q is different depending upon the source. For example, the coenzyme Q which is present in the human body or other mammals is coenzyme $Q_{10}$, i.e. the number of units in the isoprene chain is 10, while that found in microorganisms is coenzyme $Q_6$, $Q_7$, $Q_8$, $Q_9$ or $Q_{10}$. Therefore, the coenzyme $Q_7$ can be isolated from the above-mentioned sources. The coenzyme $Q_7$ can also be prepared advantageously by utilizing the processes described in the Japanese patent publications Nos. 1,877/1955 and 10,169/1957.

It is an object of the present invention to provide a method for treating diabetes mellitus with coenzyme $Q_7$. Another object of the invention is to provide a composition containing coenzyme $Q_7$ of the foregoing formula as an active ingredient, which is useful for the treatment of diabetes mellitus.

The dosage of coenzyme $Q_7$ in the method of the present invention varies depending upon the kind or the severity of diabetes mellitus or the administration method. However, the daily dosage for an adult man is generally 10 to 2500 milligrams and in case the coenzyme $Q_7$ is used in the form of injection, 10 to 1000 milligrams. The dosage is the effective amount sufficient to attain the object of the present invention. The said dosage may be reduced when the coenzyme $Q_7$ is administered together with other drugs in the treatment of diabetes mellitus.

The acute toxicity of the coenzyme $Q_7$ is $LD_{50}=4000$ milligrams per kilogram when administered intraperitoneally to mice. Toxic manifestations were not observed with daily intraperitoneal injection of 10, 20 and 50 milligrams per kilogram, respectively, in rats for 30 days and no changes were observed histologically in the pituitary, thyroid, thymus, heart, lung, liver, adrenals, spleen, kidney or testes.

According to the present invention, the active ingredient of the coenzyme $Q_7$ of the foregoing formula may be admixed with a carrier which may be either a sterile parenteral liquid or a solid material. The composition may take the form of tablets, powders, capsules or other dosage forms which are particularly useful for administration through the digestive tract. Liquid diluents are employed in sterile condition for parenteral use, that is, by injection. Such a medium may be a sterile solvent such as water or vegetable oils. The compositions may take the form of active material, namely, active ingredient thereof, admixed with solid diluents and/or tableting adjuvants such as cornstarch, lactose, talc, stearic acid, magnesium stearate, gums, or the like.

Any of the tableting materials used in pharmaceutical practice may be employed where there is no incompatibility with the said active ingredient. Alternatively the active ingredient with its adjuvant material may be placed in the usual capsules or resorbable material such as the usual gelatin capsule and administered in that form. In yet another embodiment, the composition may be put up into powder packets.

Or the active ingredient may be prepared in the form of suspension or emulsion in a material in which the active ingredient is not soluble.

The principal merits of the method of the present invention are the following:

(1) A non-toxic and physiological substance native to living organisms is employed.
(2) Sugar metabolism can be promoted and disturbance lipid metabolism can be improved.
(3) Blood sugar can be lowered and urinary sugar can be decreased.
(4) Control of the very blood sugar, the control of which is difficult with the other known methods, can be made easier.
(5) The method is effective for treating diabetes mellitus, and satisfactory effect can be expected by this method alone.
(6) Undesirable side effects of other antidiabetic drugs when used concomitantly can be suppressed.
(7) The method is effective against the secondary failure of sulfonylureas.
(8) The method can be applied both orally and parenterally. No method possessing all of these merits together can be found among hitherto known methods for treating diabetes mellitus.

For the purpose of giving those skilled in the art a better understanding of the invention, the following illustrative examples of preparations are given:

(1) A capsule containing 5.0 milligrams of coenzyme $Q_7$ and 77.0 milligrams of granular lactose.
(2) A capsule containing 20.0 milligrams of coenzyme $Q_7$ and 230.0 milligrams of granular lactose.
(3) A capsule containing 20.0 milligrams of coenzyme $Q_7$ and 230.0 milligrams of granular lactose.
(4) An injection composition containing 10 milligrams of coenzyme $Q_7$, 100 milligrams of surface active agent (a mixture of hydrogenated castor oil and ethylene oxide), 10 milligrams of benzyl alcohol, 9 milligrams of sodium chloride, and distilled water (to make the whole amount 1 milliliter).
(5) Vial injection composition containing 100 milligrams of coenzyme $Q_7$, 1000 milligrams of surface active agent (a mixture of hydrogenated castor oil and ethylene oxide), 100 milligrams of benzyl alcohol, 90 milligrams of sodum chloride, and distilled water (to make the whole amount 10 milliliters).

Following are examples of presently preferred embodiments of the present invention. From these, it will become clear that the coenzyme $Q_7$ possesses all the abovementioned merits.

In the following description, "mg.," "kg." and "ml." mean milligram(s), kilogram(s) and milliliter(s), respectively.

EFFECT OF COENZYME $Q_7$ ON BLOOD SUGAR OF THE RAT

Coenzyme $Q_7$ was first given intravenously once in a dose of 200 mg./kg. in a normal rate. Then 50 mg./kg. was given daily in alloxan diabetic rats and the results were comparatively examined.

(1) Animals used and method of feeding

Male rats of the Wistar strain weighing about 140 to 300 grams (about 2.5-months or 4-months old) were used. Solid feed for breeding of mice and rats, wheat, small fish, and vegetables were given together with sufficient amount of water.

(2) Reagents and method of administration (a) Diabetogenic substance.—Fresh 5% aqueous solution of alloxan monohydrate was injected intraperitoneally in a dose of 190 mg./kg.

(b) Reagent.—Coenzyme $Q_7$ dissolved in surface active agent-water solution (10 mg./ml.) and coenzyme $Q_7$ dissolved in pure sesame oil (500 mg./2 ml.) were used. The former was injected intravenously into the femoral vein of the rat in a dose of 200 mg./kg., and the latter was diluted with pure seame oil to 10 mg./ml. and given intraperitoneally for 11 consecutive days in a dose of 50 mg./kg./day.

TEST 1

(1) Effect of coenzyme $Q_7$ on the blood sugar of normal rats

In this test, four normal male rats, weighing about 190 to 230 grams, were used. The animals were fasted for 18 hours prior to test. The animals were anesthetized by intraperitoneal injection of 25 mg./kg. of sodium pentobarbital. Coenzyme $Q_7$ was then given intravenously in a dose of 200 mg./kg. Blood was extracted from the tail vein before and one, two and three hours after the administration. The blood sugar level was determined by the method of Somogyi-Nelson.

(2) Results

Table 1 shows the changes in the blood sugar with intravenous injection of 200 mg./kg. of coenzyme $Q_7$ in the normal rats. It can be seen that the levels at one, two and three hours, especially that at two hours, are lower than the preadministration levels.

TABLE 1

[Blood Sugar Levels with Intravenous Injection of 200 mg./kg. of Coenzyme $Q_7$]

| No. | Weight (grams) | Blood Sugar (mg./100 ml.) | | | |
|---|---|---|---|---|---|
| | | Before | After 1 hour | After 2 hours | After 3 hours |
| 1 | 220 | 90 | 92 | 54 | 60 |
| 2 | 210 | 105 | 52 | --------- | 58 |
| 3 | 190 | 90 | 48 | 65 | 80 |
| 4 | 230 | 92 | 100 | 45 | 55 |
| Average | | 94 | 76 | 55 | 63 |

TABLE 2.—Effect of Continuous Intraperitoneal Injection of 50 mg./kg./ day of Coenzyme $Q_7$ on Alloxan Diabetic Rats

| | Number of Rats | Body Weight (grams) | Blood Sugar (mg./100 ml.) | Urinary Sugar (percent) | | | | | | | | | | | Blood Sugar (mg./100 ml.) | Body Weight (grams) |
|---|---|---|---|---|---|---|---|---|---|---|---|---|---|---|---|---|
| | | | | Before administration | 1* | 2* | 3* | 4* | 5* | 6* | 7* | 8* | 9* | 10* | | |
| Group A.—Control | 29 | 220 | 660 | 0.25 | 0.25 | 0.5 | 0.25 | 0.25 | 0.25 | 0.25 | 0.25 | 0.25 | 0.25 | 0.25 | 580 | 240 |
| | 2 | 205 | 430 | 0.5 | 0.1 | 0.1 | 0.1 | 0.1 | 0.1 | 0.1 | 0.1 | 0.25 | 0.25 | 0.25 | 280 | 240 |
| | 16 | 215 | 380 | 0.5 | 0.5 | 0.5 | 1 | 1 | 1 | 0.5 | 0.5 | 0.5 | 0.5 | 0.5 | 360 | 220 |
| | 24 | 180 | 360 | 0.5 | 0.1 | 0.1 | 0.1 | 0.1 | 0.1 | 0.1 | 0.25 | 0.1 | 0.25 | 0.25 | 320 | 200 |
| | 26 | 190 | 280 | 0.25 | 0.1 | 0.1 | 0.1 | 0.1 | 0.1 | 0.1 | 0.1 | 0.25 | 0.25 | 0.25 | 200 | 240 |
| | 20 | 220 | 180 | 0.5 | 0.1 | 0.1 | 0.1 | 0.1 | 0.1 | 0.1 | 0.1 | 0.25 | 0.5 | 0.5 | 190 | 250 |
| | 8 | 200 | 180 | 0.5 | 0.1 | 0.1 | 0.1 | 0.5 | 0.1 | 0.1 | 0.1 | 0.1 | 0.25 | 0.25 | 140 | 180 |
| | 10 | 160 | 230 | 0.1 | 0.1 | 0.1 | 0.1 | 0.1 | (–) | 0.1 | 0.1 | 0.1 | 0.1 | 0.1 | 160 | 160 |
| | 28 | 145 | 250 | 0.25 | 0.1 | 0.25 | 0.1 | 0.25 | 0.25 | 0.25 | 0.25 | 0.25 | 0.25 | 0.25 | 210 | 140 |
| | — | 160 | 230 | 0.1 | Died | | | | | | | | | | | |
| Average | | 190 | 318 | 0.35 | 0.19 | 0.21 | 0.22 | 0.28 | 0.22 | 0.18 | 0.19 | 0.23 | 0.29 | 0.29 | 271 | 208 |
| Group B.—Coenzyme $Q_7$, 50 mg./kg./day. | 1 | 255 | 670 | 2 | 0.25 | 0.25 | 0.1 | 0.1 | 0.1 | 0.1 | (–) | (–) | (–) | (–) | 130 | 200 |
| | 18 | 210 | 480 | 0.5 | 0.5 | 0.5 | 0.25 | (–) | (–) | 0.1 | (–) | (–) | (–) | (–) | 125 | 280 |
| | 27 | 155 | 460 | 0.5 | 0.5 | 0.25 | 0.1 | (–) | 0.5 | (–) | (–) | (–) | (–) | (–) | 110 | 145 |
| | 17 | 205 | 340 | 0.25 | 0.25 | 0.25 | 0.1 | (–) | (–) | (–) | (–) | (–) | Below 0.1 | (–) | 135 | 210 |
| | 15 | 170 | 330 | 0.5 | 0.5 | 0.5 | 0.25 | 0.1 | (–) | (–) | (–) | (–) | (–) | (–) | 110 | 150 |
| | 25 | 180 | 220 | 0.5 | 0.5 | 0.25 | 0.1 | (–) | (–) | 0.1 | (–) | (–) | (–) | (–) | 105 | 240 |
| | 4 | 165 | 220 | 0.5 | 0.5 | 0.25 | 0.1 | (–) | (–) | (–) | (–) | (–) | (–) | (–) | 100 | 180 |
| | 7 | 220 | 200 | 0.25 | 0.25 | 0.1 | 0.1 | (–) | (–) | (–) | (–) | (–) | (–) | (–) | 105 | 190 |
| | 9 | 225 | 230 | 0.25 | 0.25 | 0.1 | 0.1 | (–) | (–) | 0.1 | 0.1 | 0.1 | (–) | (–) | 125 | 195 |
| | 30 | 240 | 330 | 0.5 | 0.5 | 0.25 | 0.1 | (–) | (–) | (–) | (–) | (–) | (–) | (–) | 125 | 250 |
| Average | | 203 | 348 | 0.58 | 0.40 | 0.26 | 0.13 | 0.02 | 0.06 | 0.04 | 0.01 | 0.01 | 0.01 | 0 | 117 | 204 |
| | | | | ↑ | ↑ | ↑ | ↑ | ↑ | ↑ | ↑ | ↑ | ↑ | ↑ | ↑ | | |

| | Number of Rats | Urinary Sugar (percent) | | | | | | | | | | Body Weight (grams) | Urinary Sugar (percent) | | | | | | Blood Sugar (mg./100 ml. | Body Weight (grams) | |
|---|---|---|---|---|---|---|---|---|---|---|---|---|---|---|---|---|---|---|---|---|---|
| | | 11(1)† | 12(2) | 13(3) | 14(4) | 15(5) | 16(6) | 17(7) | 18(8) | 19(9) | 20(10) | | 21(11) | 22(12) | 23(13) | 24(14) | 15(15) | 26(16) | | | |
| Group A.—Control | 29 | 0.25 | 0.25 | 0.25 | 0.25 | 0.25 | 0.25 | 0.5 | 0.25 | -------- | 0.1 | 240 | 0.5 | 0.25 | 0.1 | 0.25 | 0.25 | 0.25 | 260 | 240 | Decapitation. |
| | 2 | 0.25 | 0.25 | 0.25 | 0.25 | 0.25 | 0.25 | 0.25 | 0.5 | 0.5 | 0.1 | 235 | 0.5 | 0.5 | 0.25 | 0.25 | 0.25 | 0.25 | 190 | 230 | Do. |
| | 16 | 0.5 | 0.25 | 0.5 | 0.5 | 0.25 | 0.25 | 0.25 | 0.5 | 0.5 | 0.1 | 240 | 2 | 0.25 | 0.1 | 0.25 | 0.1 | 0.25 | 280 | 260 | Do. |
| | 24 | 0.25 | 0.25 | 0.5 | 0.25 | 0.25 | 0.25 | 0.25 | 0.25 | 0.5 | 0.25 | 220 | 2 | 0.25 | 0.25 | 0.25 | 0.25 | 0.25 | 240 | 230 | Do. |
| | 26 | 0.25 | 0.25 | 0.5 | 0.5 | 0.25 | 0.25 | 0.25 | 0.1 | 0.1 | 0.1 | 220 | 0.5 | 0.25 | 0.1 | 0.1 | 0.1 | 0.1 | 160 | 230 | Do. |
| | 20 | 0.5 | 0.5 | 0.5 | 0.1 | 0.25 | 0.25 | 0.5 | 0.5 | 0.25 | 0.1 | 260 | 0.25 | 0.25 | 0.1 | 0.1 | 0.1 | 0.1 | 250 | 230 | Do. |
| | 8 | 0.25 | 0.25 | 0.25 | 0.25 | 0.25 | 0.25 | 0.25 | 0.25 | 0.25 | 0.1 | | 0.1 | 0.1 | 0.1 | 0.1 | 0.1 | 0.1 | 145 | 210 | Do. |
| | 10 | 0.1 | 0.25 | 0.25 | 0.25 | 0.1 | 0.25 | 0.1 | 0.25 | 0.1 | 0.1 | 190 | (–) | 0.1 | 0.25 | 0.25 | 0.25 | 0.25 | 290 | 200 | Do. |
| | 28 | 0.25 | 0.25 | 0.25 | 0.25 | 0.25 | 0.25 | 0.25 | 0.25 | 0.1 | 0.1 | 120 | 0.5 | 0.1 | 0.1 | 0.1 | 0.25 | 0.25 | 275 | 120 | Do. |
| | — | | | | | | | | | | | | | | | | | | | | |
| Average | | 0.29 | 0.28 | 0.36 | 0.33 | 0.23 | 0.25 | 0.29 | 0.32 | 0.26 | 0.12 | 214.9 | 0.71 | 0.23 | 0.15 | 0.18 | 0.18 | 0.20 | 232 | 217 | |
| Group B.—Coenzyme $Q_7$, 50 mg./kg./day. | 1 | (–) | (–) | 0.1 | 0.1 | 0.25 | 0.25 | 0.25 | 0.25 | (–) | (–) | 190 | 0.1 | (–) | (–) | (–) | (–) | (–) | 120 | 180 | Do. |
| | 18 | 0.1 | 0.1 | 0.1 | 0.25 | 0.1 | (–) | (–) | (–) | (–) | (–) | 290 | (–) | (–) | (–) | (–) | (–) | (–) | 115 | 300 | Do. |
| | 27 | (–) | (–) | Died | | | | | | | | | | | | | | | | | |
| | 17 | (–) | 0.1 | (–) | (–) | (–) | (–) | (–) | (–) | (–) | (–) | 240 | (–) | (–) | (–) | (–) | (–) | (–) | 110 | 225 | Do. |
| | 15 | (–) | (–) | Died | | | | | | | | | | | | | | | | | |
| | 25 | (–) | (–) | 0.25 | 0.25 | 0.25 | 0.25 | 0.5 | 0.1 | 0.1 | 0.1 | 260 | (–) | 0.1 | (–) | (–) | (–) | (–) | 125 | 270 | Do. |
| | 4 | (–) | (–) | (–) | (–) | (–) | (–) | (–) | (–) | (–) | (–) | 180 | (–) | (–) | Died | (–) | | | | | |
| | 7 | (–) | (–) | (–) | (–) | (–) | (–) | (–) | (–) | (–) | (–) | 165 | (–) | (–) | (–) | (–) | (–) | (–) | 100 | 170 | Do. |
| | 9 | (–) | (–) | (–) | (–) | (–) | (–) | 0.1 | (–) | (–) | (–) | 190 | (–) | (–) | (–) | (–) | (–) | (–) | 115 | 200 | Do. |
| | 30 | (–) | (–) | 0.5 | 0.5 | 0.25 | 0.25 | 0.25 | 0.25 | (–) | (–) | 270 | (–) | (–) | (–) | (–) | (–) | (–) | 115 | 270 | Do. |
| Average | | 0.01 | 0.02 | 0.12 | 0.14 | 0.11 | 0.09 | 0.14 | 0.08 | 0.01 | 0.01 | 223 | 0.01 | 0.01 | 0 | 0 | 0 | 0 | 114 | 234 | |

*Number indicates the elapsed day(s) after initiation of treatment. ↑ The arrow denotes the injection of Coenzyme $Q_7$ or solvent. †Number in the parentheses indicates the elapsed day(s) after discontinuation of the treatment.

TEST 2

(1) Effect of long-term intraperitoneal injection of coenzyme $Q_7$ on the blood sugar and urinary sugar in the alloxan diabetic rats Thirty normal male rats, ranging in weight from 140 to 300 grams were used. 5% aqueous solution of alloxan monohydrate was given intraperitoneally in a dose of 190 mg./kg. and alloxan diabetes experimentally induced. After one week signs of alloxan diabetes had become apparent, twenty rats were selected and divided into 2 groups, A and B. Each group was made up so as to contain animals showing more or less similar degree of severity.

Group A was the control, and Group B was given coenzyme $Q_7$. Tes-Tape (Lilly) was used to examine the urinary sugar and the method of Somogyi-Nelson was used for determining the blood sugar. The method described in Test 1 was followed for extraction of blood but in this test the animals were not fasted before the test. To determine the severity or quantity of urinary sugar with Tes-Tape, we took the following standard:

| Tes-Tape finding: | Indication |
|---|---|
| No coloring | (−). |
| Considered to be coloring below 0.05% | Below 0.1%. |
| Considered to be above 0.05% and below 0.125% | 0.1%. |
| Considered to be above 0.125% and below 0.5% | 0.25%. |
| Considered apparently to be above 2%, showing deep coloring | 1%. |

In determining the degree of severity, the part of the Tes-Tape showing the deepest coloring was used as the basis.

The weight of the animals was recorded and the sugar in the fresh urine was determined before the administration of coenzyme $Q_7$ (blood sugar was also determined at appropriate time). Group B was given coenzyme $Q_7$ intraperitoneally (10 mg./ml. solution in sesame oil) in a dose of 50 mg./kg./day, while group A was given solvent (sesame oil) alone intraperitoneally in a dose of 5 ml./kg./day. A total of 11 injections were given. The body weight, urinary sugar and blood sugar were examined for 16 days after discontinuation of administration of coenzyme $Q_7$.

Upon completion of the test (26 days after initiation and 16 days after discontinuation of treatment), the rats were sacrificed by a sharp blow to the head. The pancreas was removed in three sections, namely, head (duodenal), body (gastric) and tail (splenic). The sections were then fixed in Bouin's solution diluted two-fold with water, embedded in paraffin, 4 micron thick sections prepared and stained with Gomori's chrome-hematoxylin phloxine. The sections were examined microscopically and the average number of cells in a Langerhans' islet was counted. The cells in 20 islets each in the head, body and tail for a total of 60 were counted and the average, which was used as the basis of determining the effect of coenzyme $Q_7$, was calculated.

(2) Results

Table 2 shows the blood sugar, urinary sugar and body weight with continuous intraperitoneal injections of 50 mg./kg./day of coenzyme $Q_7$ (in sesame oil) and Table 3 shows the number of α- and β-cells in Langerhans' islet.

TABLE 3

[Number of cells in a Langerhans' Islet of alloxan diabetic rats following intraperitoneal injections of 50 mg./kg./day of Coenzyme $Q_7$]

| Number of Animals | Average Number of Cells in Langerhans' Islet | | |
|---|---|---|---|
| | α-Cell | β-Cell | Indefinite Cell |
| Group A: | | | |
| 2 | 13.1 | 20.4 | 4.1 |
| 16 | 14.3 | 23.8 | 4.3 |
| 20 | 12.9 | 21.6 | 5.2 |
| Average | 13.5 | 21.9 | 4.5 |
| Group B: | | | |
| 1 | 15.2 | 32.1 | 3.8 |
| 7 | 10.7 | 30.7 | 3.3 |
| 9 | 11.1 | 29.4 | 5.2 |
| 18 | 12.8 | 33.9 | 2.8 |
| 25 | 14.4 | 28.6 | 4.8 |
| 30 | 11.9 | 30.3 | 7.2 |
| Average | 12.7 | 30.8 | 5.3 |

As can be seen from Table 2, signs of decrease in the urinary sugar become apparent 3 days after administration of coenzyme $Q_7$ and become more noticeable after 4 days. In 9 to 10 days, completely negative results are found.

On the other hand, positive results were obtained in the control group throughout. After 10 days, administration of coenzyme $Q_7$ was discontinued. A transient appearance of urinary sugar was found in Nos. 1, 18, 25 and 30 of the coenzyme $Q_7$ group in the 16 days follow-up period, but there was an early return to the negative. At the end of the test, all the rats showed negative urinary sugar whereas all 9 animals in the control group showed positive urinary sugar.

Blood sugar level was determined 3 times, that is, before, 10 days after and at the end of the test, and the results were more or less in parallel with the urinary sugar. The coenzyme $Q_7$ group showed virtually normal levels after 10 days and at the end of the test, while 8 out of 9 animals of the control group showed significantly high level (diabetic level), and one (No. 8) showed a somewhat high level.

No significant difference in body weight was found between these two groups.

Tablet 3 shows the effect on the cells of the Langerhans' islets. In Group A, the number of β-cells in a Langerhans' islet averaged 21.9 (3 rats). This figure can be interpreted to mean that there was not so serious alloxan diabetes. On the other hand, 6 rats of Group B showed an average of 30.8 and all except two (Nos. 9, 25) had more than 30 cells. Even these two had 29.4 and 28.6, respectively, exceeding that in Group A. The fact that the number of β-cells in Group B is larger than the threshold for occurrence of diabetes is in complete accord with the findings at the end of the test that these animals have been cured.

SUMMARY (1) A definite fall of blood sugar was found two hours after intravenous injection of 200 mg./kg. of coenzyme $Q_7$ in normal Wistar strain rats which had been fasted for 18 hours. Observations were made one, two and three hours after the injection.

(2) Continuous intraperitoneal injections of 50 mg./kg./day of coenzyme $Q_7$ were given in Wistar strain rats with mild alloxan diabetes of one week duration. Signs of diabetes improved within a few days and soon disappeared. Administration was discontinued after 10 days, and though there was a transient fluctuation, the condition was restored within a short time. These findings were also substantiated morphologically.

EFFECT OF COENZYME Qn INJECTION ON DISTURBANCE OF SUGAR METABOLISM IN DIABETES

It is well known that diabetes mellitus is a disease caused by the relative deficiency of insulin in the body, which results in disturbance of the system for utilizing sugar. In order to examine the effect of coenzyme Qn on the disturbance of the system for utilizing sugar, glucose-U-$^{14}C$ was injected intraperitoneally in normal and alloxan diabetic rats and the $^{14}CO_2$ output in the breath measured over a period of two hours.

The $^{14}CO_2$ output in the normal rat is 14.3±0.3 percent in one hour, and 32.6±7.0 percent in two hours. Intramuscular injection of 40 mg./kg. of coenzyme $Q_7$ 2 times in 2 days resulted in a slight increase in the output to 19.3±3.0 percent in one hour. The $^{14}CO_2$ output after glucose-U-$^{14}C$ injection in the alloxan diabetic rats decreased to about one half that of the normal rat, but there was a marked improvement with eventual return to normal after injection of coenzyme $Q_7$ (Table 4).

Oral administration of coenzyme $Q_7$ in a dose of 10 to 30 mg. daily for 2 to 3 weeks in a diabetic showing increasing ratios of urinary pyruvic acid and α-ketoglutaric acid by intravenous injection of 20 ml. of 50% fructose solution resulted in a marked decrease and a trend for normalization was seen (Table 5).

Phenethylbiguanide (DBI) is used widely as an oral hypoglycemic agent. Besides depressing the blood sugar, DBI suppresses the peripheral oxidation system and increases blood pyruvic acid and α-ketoglutaric acid levels. A marked rise of pyruvic acid in blood was found three hours after intraperitoneal injection of 50 mg./kg. DBI in the rat, but when DBI was given after injection of 40 mg./kg. of coenzyme $Q_7$ twice in 2 days, there was scarcely any increase of pyruvic acid in blood (Table 6).

These results indicate that coenzyme $Q_7$ has an action of improving the disturbance of the system for utilizing glucose and/or α-keto acids in diabetic animals and patients.

The blood sugar level was examined at two, four and six hours after oral administration of 50 mg./kg. of coenzyme $Q_7$ in normal and alloxan diabetic rabbits. It was found that the blood sugar dropped in two to four hours in normal rabbits, while a similar drop was found in four hours in the alloxan rabbits (Table 7).

Coenzyme $Q_7$ (100 mg.) was given intravenously in five normal subjects and nine diabetic patients, and it was found that the blood sugar decreased in two hours in the former and in one, two and three hours in the latter (Table 8).

TABLE 4

[Effect of Intramuscular Injection of Coenzyme $Q_7$ (40 mg./kg. Twice for Two Days) on $^{14}CO^2$ Output in Breath After Glucose-U-$^{14}C$ in Vivo]

| Experimental Rats | Number of Rats | $^{14}CO_2$ Output in Breadth | | |
|---|---|---|---|---|
| | | 1st hour (percent) | 2d hour (percent) | Total (percen |
| Normal | 9 | 14.3±0.3 | 18.3±1.8 | 32.6±7.0 |
| Normal plus coenzyme $Q_7$ | 4 | 19.3±3.0 | 15.4±3.7 | 34.7±4.3 |
| Alloxan diabetes | 5 | 8.0±2.0 | 10.5±1.6 | 18.5±2.9 |
| Alloxan diabetes plus coenzyme $Q_7$ | 5 | 22.3±3.1 | 17.1±1.6 | 39.4±4.9 |

TABLE 5

[Effect of Coenzyme $Q_7$ treatment on increasing ratios of urinary α-keto acids after fructose loading in diabetics]

| α-keto acid | Case | Before treatment | | After treatment | |
|---|---|---|---|---|---|
| | | 1 hour | 2 hours | 1 hour | 2 hours |
| Pyruvic acid | 13 | [1] 2.55±0.25 | 1.44±0.20 | 2.13±0.32 | 1.00±0.10 |
| α-keto glutaric acid | 9 | 1.99±0.14 | 1.51±0.08 | 1.41±0.15 | 1.00±0.16 |

[1] Means the standard errors.

NOTE.—In the above table, the amount of urinary α-keto acids during 1 hour before ructose loading were calculated as 1.0.

TABLE 6

[Effect of Coenzyme $Q_7$ on DBI-induced hyper lactic acidemia of rats]

| | Case | No Administration | Case | Coenzyme $Q_7$ administration |
|---|---|---|---|---|
| Control group | 7 | [1] 18.5±1.6 | 8 | 17.7±1.8 |
| DBI treated group | 8 | 28.2±4.3 | 6 | 18.5±4.3 |

[1] Means the standard errors.

NOTE.—In the above table, the figures show the amount (milligrams) oflactic acid in 100 milliliters of blood.

TABLE 7

Effect of oral administration of 50 mg./kg. Coenzyme $Q_7$ on blood sugar in normal and alloxan diabetic rabbits]

| Normal Rabbits | Case | Hours after Coenzyme $Q_7$ administration | | |
|---|---|---|---|---|
| | | 2 hours | 4 hours | 6 hours |
| Control group | 8 | [1] 104±3 | 105±3 | 101±6 |
| Coenzyme $Q_7$ treated group | 6 | 84±7 | 92±7 | 99±8 |
| **Alloxan Diabetic Rabbits** | **Case** | **Hours after Coenzyme $Q_7$ administration** | | |
| | | 2 hours | 4 hours | 6 hours |
| Control group | 5 | [1] 108±7 | 108±6 | 102± |
| Coenzyme $Q_7$ treated group | 8 | 111±8 | 93±7 | 91±7 |

[1] Means the standard errors.

NOTE.—In the tables mentioned above, the figures show percent change of the blood sugar.

TABLE 8

[Effect of intravenous injection of 100 mg. Coenzyme $Q_7$ on blood sugar in normal subjects and diabetics]

| Normal Subjects | Case | Hours after Coenzyme $Q_7$ administration | | |
|---|---|---|---|---|
| | | 1 hour | 2 hours | 3 hours |
| Control group | 4 | [1] 101±2 | 93±2 | 109±7 |
| Coenzyme $Q_7$ treated group | 5 | 97±5 | 88±2 | 97±3 |
| **Diabetics** | **Case** | **Hours after Coenzyme $Q_7$ administration** | | |
| | | 1 hour | 2 hours | 3 hours |
| Control group | 5 | [1] 106±5 | 102±5 | 100±5 |
| Coenzyme $Q_7$ treated group | 9 | 88±3 | 83±3 | 82±4 |

[1] Means the standard errors.

NOTE.—In the tables mentioned above, the figures show percent change of the blood sugar.

EFFECT OF COENZYME $Q_7$ ON DIABETIC NEUROPATHY

Coenzyme $Q_7$ was given in patients with diabetic neuropathy and the effect on the subjective symptoms, patellar reflex, calf tenderness and the vibratory sense of the limbs was examined.

The examined cases included 10 males and 8 females, ranging in age from 17 to 64. The patients were given orally 10 mg. of coenzyme $Q_7$ a day in two divided doses, after breakfast and supper for 3 to 13 weeks.

Of the 14 cases whose subjective symptoms included malaise of the limbs, paresthesia and pain of the limbs and intercostal areas, seven cases (or 50 percent) reported complete or partial recovery. Further, of the 13 cases who had adnormal patellar reflex, four cases (or 31 percent) showed improvement. Of 16 cases who had calf tenderness, seven cases (or 44 percent) were improved.

The effect on disturbance of the vibratory sense of the limbs was noteworthy. Of the 17 cases in which an abnormal threshold was found in the index finger, 12 cases (or 71 percent) showed improvement of more than 5 decibels, and of the 15 cases with an abnormality in the toes, seven cases (or 47 percent) showed a similar improvement (Tables 9, 10 and 11).

From these findings, it can be considered that coenzyme $Q_7$ is effective on diabetic neuropathy.

TABLE 9

[Effect of Coenzyme $Q_7$ on Subjective Symptoms, Patellar Reflex and Calf Tenderness in Patients With Diabetic Neuropathy]

| No. | Name | Age and Sex | Duration of Treatment (week) | Before treatment | | | | | After treatment | | | | |
|---|---|---|---|---|---|---|---|---|---|---|---|---|---|
| | | | | Subject symptoms | Patellar reflex | | Calf tenderness | | Subject symptoms | Patellar reflex | | Calf tenderness | |
| | | | | | r. | l. | r. | l. | | r. | l. | r. | l. |
| 1 | J.M | 63, M | 6 | Pain of r. arm, knee arthralgra. | Normal | Normal | ++ | + | No change | Normal | Normal | + | + |
| 2 | R.Y | 17, F | 4 | None | Absent | Decreased | − | − | None | Absent | Decreased | − | − |
| 3 | Y.I | 41, F | 5 | do | Decreased | do | + | − | do | Decreased | Normal | − | − |
| 4 | T.I | 57, M | 5 | Knee arthralgra | do | do | + | + | No change | Normal | Decreased | + | − |
| 5 | K.T | 59, F | 9 | Fatigue of legs | Normal | Normal | + | − | Improved | Decreased | Normal | + | − |
| 6 | S.M | 58, F | 5 | Paresthesia of legs. | do | do | + | + | No change | Normal | do | + | + |
| 7 | K.A | 58, M | 5 | do | Decreased | Decreased | + | + | Improved | Absent | Decreased | + | + |
| 8 | E.T | 64, F | 7 | Fatigue of legs | Absent | Absent | − | − | do | do | Absent | − | − |
| 9 | T.N | 61, M | 11 | Paresthesia of legs. | do | do | ++ | + | No change | do | do | − | − |
| 10 | S.K | 60, M | 3 | Fatigue of legs | do | do | + | + | Disappeared | do | do | + | + |
| 11 | Y.M | 64, F | 5 | Pain of feet | Decreased | Decreased | + | + | do | Decreased | Decreased | + | + |
| 12 | S.S | 56, M | 10 | None | do | do | + | + | None | do | do | − | − |
| 13 | F.O | 47, F | 8 | do | Absent | do | − | + | do | do | Normal | − | + |
| 14 | C.A | 63, F | 4 | Paresthesia of legs. | do | Absent | ++ | + | Improved | Absent | Absent | + | + |
| 15 | M.K | 58, M | 4 | Fatigue of legs | do | Normal | +++ | + | do | Decreased | Normal | +++ | + |
| 16 | Z.T | 54, M | 7 | Paresthesia of legs. | Normal | do | ++ | + | No change | Normal | do | ++ | − |
| 17 | M.Y | 50, M | 11 | Intercostal pain | do | do | + | − | do | do | do | + | − |
| 18 | S.N | 38, M | 13 | Fatigue of legs | Absent | Absent | ++ | − | do | Absent | Absent | ++ | − |

NOTE.—In the above table, r., l., M., and F. mean right, left, Male and Female, respectively.

TABLE 10

[Effect of Coenzyme $Q_7$ on Vibratory Sense of the Limbs in Diabetic Neuropathy]

| Name | Age, Sex | Duration of Treatment (week) | Before | | | | After | | | |
|---|---|---|---|---|---|---|---|---|---|---|
| | | | 2d finger (r.),[1] decibels | 2d finger (l.),[1] decibels | toe (r.), decibels | Toe (l.), decibels | 2d finger (r.), decibels | 2d finger (l.), decibels | Toe (r.), decibels | Toe (l.), decibels |
| J.M | 63, M | 6 | +1 | +2 | +7 | +12 | −3 | −4 | +6 | +6 |
| R.Y | 17, F | 4 | −2 | −7 | 0 | 0 | −7 | −7 | 0 | 0 |
| Y.L | 41, F | 5 | −7 | −9 | −2 | +1 | −10 | −12 | −10 | −8 |
| T.I | 57, M | 5 | −2 | +8 | −1 | +4 | −1 | −3 | −8 | +3 |
| K.T | 59, F | 9 | −1 | −3 | +7 | +11 | −7 | −11 | +6 | +6 |
| S.M | 58, F | 5 | +3 | −7 | +4 | +4 | −7 | −8 | +2 | +6 |
| K.A | 58, M | 5 | −3 | +1 | +14 | +13 | −3 | −4 | +15 | +13 |
| E.T | 64, F | 7 | +2 | 0 | +15 | +15 | +4 | +6 | +16 | +19 |
| T.N | 61, M | 11 | −7 | −4 | +2 | 0 | −11 | −12 | +4 | +3 |
| S.K | 60, M | 3 | −2 | −7 | −1 | −2 | −5 | −7 | 0 | 0 |
| Y.M | 64, F | 5 | −1 | +1 | +3 | −3 | −8 | −8 | 0 | −3 |
| S.S | 56, M | 10 | −2 | −8 | +3 | +2 | −9 | −14 | +2 | +2 |
| F.O | 47, F | 8 | −4 | −8 | +4 | 0 | −12 | −12 | −5 | 0 |
| C.A | 63, F | 4 | +5 | −4 | +13 | +12 | 0 | +1 | +5 | +5 |
| M.K | 58, M | 4 | +9 | +5 | +13 | +15 | +4 | 0 | +10 | +13 |
| Z.T | 54, M | 7 | −6 | −6 | +19 | +19 | −8 | −13 | +13 | +12 |
| M.Y | 50, M | 11 | 0 | −9 | −8 | −9 | +3 | −2 | +7 | 0 |
| S.N | 38, N | 13 | −14 | −13 | +5 | 0 | −13 | −9 | +13 | +15 |

[1] r.=right; l.=left.

TABLE 11

[Effect of Coenzyme $Q_7$ on Diabetic Neuropathy (18 Cases)]

| | Subjective symptoms | Patellar reflex | Calf tenderness | Vibratory Sense | |
|---|---|---|---|---|---|
| | | | | Hand finger | Foot finger |
| Improved | 7 (50%) | 4 (31%) | 7 (44%) | 12 (71%) | 7 (47%) |
| No change | 7 (50%) | 7 (54%) | 9 (56%) | 3 (18%) | 6 (40%) |
| Exacerbated | 0 | 2 (15%) | 0 | 2 (11%) | 2 (13%) |
| Normal before treatment | 4 | 5 | 2 | 1 | 3 |

EFFECT OF COENZYME $Q_7$ ON DABETIC NEUROPATHY

Coenzyme $Q_7$ capsule containing 5 mg. of coenzyme $Q_7$ in one capsule was used in the present test. The effect on diabetic neuropathy was examined.

The subjects were 10 diabetics with peripheral neuropathy. The dosage was 10 mg. daily in two divided doses (after breakfast and supper) or 15 mg. daily in three divided doses (after each meal) for 3 to 4 weeks. The effect on the subjective symptoms, patellar reflex, calf tenderness and blood sugar was examined before and after administration.

The dosage, subjective symptoms before and after administration and the findings in each case are shown in Table 12.

The results are shown in Table 13. It can be seen that 47% of the cases with subjective symptoms such as pain, malaise and paresthesia showed improvement. Of the 10 patients with patellar reflex, one case showed improvement and three cases of 10 cases with a complaint of calf tenderness reported improvement.

It is noteworthy that in three cases there was recurrence or exacerbation of the symptoms when administration was discontinued following a pronounced improvement. This is considered to substantiate the effect of this agent (Table 12).

The effect of the coenzyme $Q_7$ on the blood sugar level was also examined. Of nine cases, five showed a drop, three no change and an increase was found in one (Table 14).

From the results of the test, coenzyme $Q_7$ appears effective in some cases of diabetic neuropathy.

TABLE 12

[Effect of Coenzyme $Q_7$ on Subjective Symptoms and Objective Views of Diabetic Neuropathy]

| Case No. | Name | Age (sex) | Duration of treatment, week | Dosage (mg./day) | Before treatment | | | | | |
|---|---|---|---|---|---|---|---|---|---|---|
| | | | | | Control | Subjective symptoms | Patellar reflex | | Calf tenderness | |
| | | | | | | | r. | l. | r. | l. |
| 1 | NS | 44 (F) | 4 | 10 | Poor | Fatigue of legs, pain and coldness of soles, paresthesia and coldness of r. hand. | Absent | Absent | +++ | ++ |
| 2 | YN | 66 (F) | 2 | 10 | Fair | Fatigue of legs | Decreased | Decreased | ++ | ++ |
| 3 | MR | 45 (M) | 4 | 10 | Good | Paresthesia of legs, hyperparesthesia of chest. | Absent | Absent | ++ | ++ |
| 4 | MH | 58 (M) | 3 | 15 | Poor | Lumbago, burning soles | do | do | + | + |
| 5 | YS | 66 (F) | 4 | 10 | do | Fatigue and pain of legs, paresthesia of toes. | do | Decreased | + | + |
| 6 | NK | 40 (F) | 3 | 15 | Good | Fatigue of legs, paresthesia of soles | do | Absent | ++ | ++ |
| 7 | ML | 66 (F) | 3 | 15 | Poor | Paresthesia of extremities, abdomen and lips. | do | do | ++ | ++ |
| 8 | NJ | 45 (M) | 3 | 15 | do | Fatigue of legs, paresthesia of extremities. | do | do | + | — |
| 9 | ME | 46 (M) | 4 | 10 | do | Paresthesia of toes, pain of l. toe and both shanks. | do | do | ++ | ++ |
| 10 | UZ | 69 (M) | 3 | 15 | do | None | Decreased | Decreased | + | + |

| Case No. | After treatment | | | | | | Other treatment | Symptoms after discontinuation of treatment |
|---|---|---|---|---|---|---|---|---|
| | Subjective symptoms | Control | Patellar reflex | | Calf tenderness | | | |
| | | | r. | l. | r. | l. | | |
| 1 | Improved | Good | Decreased | Decreased | + | + | Chlorpropamide | Improvement of fatigue of legs, paresthesia of r. hand recurred. |
| 2 | No change | do | do | do | ++ | ++ | Acetihexamide | |
| 3 | do | do | Absent | Absent | ++ | ++ | Chlorpropamide DBI-TD (Timed Disintegration). | |
| 4 | Absent | do | do | do | — | — | Lente insulin acetohexamide | Burning soles appeared, improved after readministration. |
| 5 | Improved | Poor | do | Decreased | + | — | Chlorpropamide | Exacerbation of fatigue of legs. |
| 6 | do | do | do | Absent | ++ | ++ | do | Improved of paresthesia. |
| 7 | Absent | do | do | Decreased | — | — | Lente insulin | No recurrence of subjective symptoms. |
| 8 | do | Good | do | do | — | — | Regular insulin | Do. |
| 9 | Improved | Poor | do | Absent | ++ | ++ | Lente insulin | Improvement of pain maintained. |
| 10 | None | do | Decreased | Decreased | + | + | Tolbutamide | |

NOTE.—In the above table, r., l., M. and F. mean right, left, Male and Female, respectively.

TABLE 13

[Effect of Coenzyme $Q_7$ Treatment on Subjective and Objective Symptoms in Patients with Diabetic Neuropathy]

| | Subjective symptoms (17 frequencies) | | | Patellar reflex (10 cases) | Calf tenderness (10 cases) |
|---|---|---|---|---|---|
| | Pain (4 frequencies) | Fatigue (5 frequencies) | Paresthesia (8 frequencies) | | |
| Ineffective | 1 | 2 | 3 | 7 | 5 |
| Slightly effective | 1 | 0 | 2 | 2 | 2 |
| Effective | 2 | 3 | 3 | 1 | 3 |
| | 8 (47%) | | | | |

TABLE 14

[Effect of Coenzyme $Q_7$ on the Fasting Blood Sugar in Diabetics]

| Cases | Before treatment | After treatment |
|---|---|---|
| 1 | 174 | 90 |
| 2 | 128 | 112 |
| 3 | 84 | 106 |
| 4 | 190 | 82 |
| 5 | | |
| 6 | 132 | 214 |
| 7 | 230 | 188 |
| 8 | 288 | 130 |
| 9 | 168 | 180 |
| 10 | 240 | 160 |

NOTE.—In the above table, the figures show mg. percent change of blood sugar.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method of treating diabetes mellitus in a human, which comprises administering an effective quantity of coenzyme $Q_7$ to the human.

2. A method of treating diabetes mellitus in a human, which comprises administering 10 to 2500 milligrams of coenzyme $Q_7$ per day orally to the human.

3. A method of treating diabetes mellitus in a human, which comprises administering 10 to 1000 milligrams of coenzyme $Q_7$ per day by injection to the human.

4. A method according to claim 2 wherein the administration is in unit dosage form.

5. A method according to claim 3 wherein the administration is in unit dosage form.

References Cited

FOREIGN PATENTS 925,581 5/1963 Great Britain.

ALBERT T. MEYERS, *Primary Examiner.*

J. GOLDBERG, *Assistant Examiner.*